(12) United States Patent
Liu et al.

(10) Patent No.: US 12,363,684 B2
(45) Date of Patent: Jul. 15, 2025

(54) RESOURCE DETERMINING METHOD AND TERMINAL

(71) Applicant: VIVO MOBILE COMMUNICATION CO., LTD., Dongguan (CN)

(72) Inventors: Siqi Liu, Dongguan (CN); Zichao Ji, Dongguan (CN); Shixiao Liu, Dongguan (CN); Yu Zeng, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 430 days.

(21) Appl. No.: 17/959,726

(22) Filed: Oct. 4, 2022

(65) Prior Publication Data
US 2023/0027463 A1    Jan. 26, 2023

Related U.S. Application Data

(63) Continuation of application No. PCT/CN2021/085819, filed on Apr. 7, 2021.

(30) Foreign Application Priority Data

Apr. 8, 2020   (CN) .......................... 202010271294.7

(51) Int. Cl.
*H04W 72/02*   (2009.01)
*H04W 56/00*   (2009.01)
(Continued)

(52) U.S. Cl.
CPC ......... *H04W 72/02* (2013.01); *H04W 56/001* (2013.01); *H04W 72/0446* (2013.01); *H04W 92/18* (2013.01)

(58) Field of Classification Search
CPC . H04W 72/02; H04W 72/0446; H04W 72/12; H04W 24/02; H04W 56/001; H04W 92/18
(Continued)

(56) References Cited

U.S. PATENT DOCUMENTS

2018/0098322 A1    4/2018  Yoon
2020/0205161 A1*   6/2020  Zhou ................... H04W 74/002
(Continued)

FOREIGN PATENT DOCUMENTS

CN    110392431 A    10/2019
CN    110958092 A     4/2020
(Continued)

OTHER PUBLICATIONS

China National Intellectual Property Administration, International Search Report issued in corresponding Application No. PCT/CN2021/085819, mailed Jul. 7, 2021.
(Continued)

*Primary Examiner* — Jungwon Chang
(74) *Attorney, Agent, or Firm* — The Webb Law Firm

(57) ABSTRACT

Embodiments of the present disclosure provide a resource determining method and a terminal. The method includes: obtaining resource indication information, where the resource indication information includes at least one of the following: at least one target time period, at least one resource bitmap, and a period of the at least one resource bitmap; and determining, according to the resource indication information, a resource used for sidelink transmission or a resource used for sidelink transmission within the target time period.

20 Claims, 2 Drawing Sheets

(51) Int. Cl.
*H04W 72/0446* (2023.01)
*H04W 92/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2021/0068125 A1* | 3/2021 | Lin | H04W 76/14 |
| 2021/0176747 A1* | 6/2021 | Yang | H04W 72/0446 |
| 2021/0289473 A1* | 9/2021 | Chae | H04W 72/12 |
| 2021/0329633 A1* | 10/2021 | Xing | H04W 72/0446 |
| 2021/0392654 A1* | 12/2021 | Lin | H04W 76/27 |

FOREIGN PATENT DOCUMENTS

| | | |
|---|---|---|
| CN | 110972265 A | 4/2020 |
| CN | 110972297 A | 4/2020 |
| WO | 2020/025042 A1 | 2/2020 |

OTHER PUBLICATIONS

FUJITSU. "Resource Allocation for NR V2X Sidelink Communication" 3GPP TSG RAN WGJ Meeting #95, RI-1812410, Nov. 16, 2018.

Ericsson, "Resource allocation for Mode-2 transmissions", 3GPP TSG-RAN WG1 Meeting #99, Reno, NV, Nov. 18-22, 2019, R1-1912599.

* cited by examiner

RESOURCE DETERMINING METHOD AND TERMINAL

CROSS-REFERENCE TO RELATED APPLICATIONS

This application is a continuation of International Application No. PCT/CN2021/085819, filed on Apr. 7, 2021, which claims priority to Chinese Patent Application No. 202010271294.7, filed in China on Apr. 8, 2020, which are incorporated herein by reference in their entireties.

TECHNICAL FIELD

The present disclosure relates to the field of communications technologies, and in particular, to a resource determining method and a terminal.

BACKGROUND

In the prior art, the length of a time domain resource of a sidelink (SL) resource pool in Long Term Evolution (LTE) is related to seven possible LTE time division duplexing (TDD) configurations, but the TDD configuration of a current new radio (NR) is very flexible, and a quantity of uplink resources ranges from 0 to 80. In addition, a quantity of slots used for SL synchronization signal transmission is also very flexible, and one synchronization resource includes 1 to 64 slots for SL synchronization signal transmission. Therefore, the SL resource pool cannot give an adapted bitmap indication information one by one like the LTE, and it will make the design very complicated.

SUMMARY

Embodiments of the present disclosure provide a resource determining method and a terminal.

According to a first aspect of the present disclosure, a resource determining method is provided, applied to a terminal, which includes:

obtaining resource indication information, where the resource indication information includes at least one of the following: at least one target time period, at least one resource bitmap, and a period of the at least one resource bitmap; and determining, according to the resource indication information, a resource used for sidelink transmission or a resource used for sidelink transmission within the target time period.

According to a second aspect of the present disclosure, a terminal is provided, which includes:

an obtaining module, configured to obtain resource indication information, where the resource indication information includes at least one of the following: at least one target time period, at least one resource bitmap, and a period of the at least one resource bitmap; and a determining module, configured to determine, according to the resource indication information, a resource used for sidelink transmission or a resource used for sidelink transmission within the target time period.

According to a third aspect of the present disclosure, a terminal is provided, which includes a processor, a memory, and a computer program that is stored in the memory and that can run on the processor, and when the computer program is executed by the processor, steps of the foregoing resource determining method are implemented.

According to a fourth aspect of the present disclosure, a computer readable storage medium is provided. The computer readable storage medium stores a computer program, and when the computer program is executed by a processor, steps of the foregoing resource determining method are implemented.

According to a fifth aspect of the present disclosure, a computer program product is provided. The computer program product is stored in a non-volatile storage medium, and the program product is executed by at least one processor to implement steps of the foregoing resource determining method.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

In the embodiments of the present disclosure, the word such as "example" or "for example" is used to represent giving an example, an illustration, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

The embodiments of the present disclosure are described below in conjunction with the accompanying drawings. A resource determining method and a terminal according to the embodiments of the present disclosure may be applied to a wireless communications system. The wireless communications system may be a 5G system, an LTE system, an evolved long term evolution (Evolved Long Term Evolution, eLTE) system, or a subsequent evolved communications system.

A network side device according to the embodiments of the present disclosure may be a base station. The base station may be a commonly used base station, or may be an evolved node base station (eNB), or may be further a device such as a network side device (for example, a next generation node base station (gNB) or a transmission and reception point (TRP)) or a cell in a 5G system.

The terminal provided in the embodiments of the present disclosure may be a mobile phone, a tablet computer, a notebook computer, an ultra-mobile personal computer (UMPC), a netbook, a wearable device (Wearable Device), a vehicle-mounted device, a personal digital assistant (PDA), or the like. It should be noted that a specific type of the terminal is not limited in this embodiment of the present disclosure. In the embodiments of the present disclosure, an LTE system and an NR system are used as examples, but this system is not limited. The technical solution provided in the present disclosure may be applied to another system that has a same problem.

Figure 1:
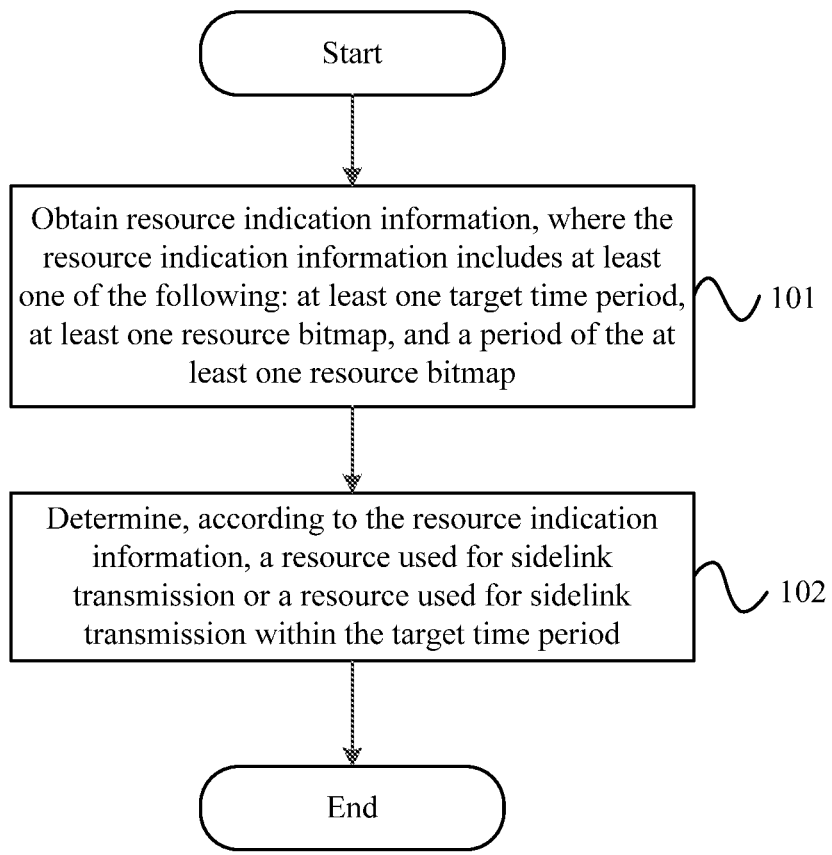
FIG. 1 is a flowchart of steps of a resource determining method according to an embodiment of the present disclosure.

As shown in FIG. 1, an embodiment of the present disclosure provides a resource determining method, applied to a terminal. The method includes the following steps.

Step 101: Obtain resource indication information. The resource indication information includes at least one of the following: at least one target time period, at least one resource bitmap (bitmap), and a period of the at least one resource bitmap.

In this step, a unit of the period of the resource bitmap may be slot (slot) or millisecond (ms).

Optionally, the resource indication information is obtained by at least one manner of configuring by a control node, pre-configuration, pre-definition (such as protocol definition), instructing from other terminals, or determining by the terminal itself. The foregoing control node may be a base station (for example, an eNB, a gNB, or another network device), or may be a node having a scheduling ability (for example, a road side unit RSU) or a terminal having an ability to schedule another user.

Step 102: Determine, according to the resource indication information, a resource used for sidelink transmission or a resource used for sidelink transmission within the target time period.

Optionally, the foregoing resource used for sidelink transmission may also be referred to as a resource of a resource pool used for sidelink transmission. The resource pool may also be referred to as a sidelink resource pool.

In this embodiment of the present disclosure, the sidelink transmission includes: sidelink transmit (transmit) and/or sidelink receive (receive). As an optional embodiment, the resource used for sidelink transmission includes at least one of the following:

a second resource used for sidelink transmit; and
a third resource used for sidelink receive.

Optionally, in the foregoing embodiment of the present disclosure, the second resource may be referred to as a resource of a transmit resource pool (Tx pool) used for sidelink transmit; and/or the third resource may be referred to as a resource of a receive resource pool (Rx pool) used for sidelink receive.

Optionally, in the foregoing embodiment of the present disclosure, there is a correspondence (or a mapping relationship) between the second resource and the third resource, and the correspondence may be network-configured, pre-configured, protocol-defined, or determined by the terminal itself. For example, it is considered that there is a correspondence between the Tx pool and the Rx pool that have a same ID.

If there is a correspondence between the second resource and the third resource, contents contained in the resource indication information are at least partially the same. For example, the resource indication information meets at least one of the following:

at least one resource bitmap has a same length;
at least one resource bitmap has a same content; and
at least one resource bitmap has a same period.

Preferably, if there is a correspondence between the second resource and the third resource, contents contained in the resource indication information are completely the same. For example, the resource indication information of the Tx pool and the Rx pool that have the same ID are the same. Further, time domain resources contained in the Tx pool and the Rx pool that have the same ID are the same.

As another optional embodiment, the foregoing correspondence includes at least one of the following:

a correspondence between the second resource and the third resource with a same target identifier; for example, the target identifier is at least one of a cell identifier, a resource pool identifier, and a bandwidth part BWP identifier;

a correspondence between the second resource and the third resource with a same subcarrier spacing SCS;

a correspondence between the second resource and the third resource with a same cyclic prefix CP;

a correspondence between the second resource and the third resource with a same priority (or a same priority threshold); for example, the priority may be at least one of a service priority and a logical channel (LCH) priority;

a correspondence between the second resource and the third resource with a same quality of service QoS requirement;

a correspondence between the second resource and the third resource that can be used for unicast (unicast) transmission;

a correspondence between the second resource and the third resource that can establish a PC5 radio resource control RRC connection; and a correspondence between the second resource and the third resource that contain a same feedback resource. For example, the feedback resource is a PSFCH (Physical Sidelink Feedback Channel) resource. The same feedback resource includes: at least one of a feedback resource period, a feedback resource time domain position, and a feedback resource frequency domain position is the same.

As an optional embodiment, a length of the resource bitmap includes at least one of the following:

1; 2; 4; 8; 16; 24; 32; or 64*Z, where Z is an integer greater than or equal to 1. And, 64*Z<=10,240*8.

In this embodiment of the present disclosure, the terminal obtains the resource bitmap contained in the resource indication information, the length and period of the resource bitmap are factors or multiples of 64 or 128, the resource used for sidelink transmission can be determined based on the resource bitmap, and there is no need to define a reserved resource, which simplifies the design of the resource indication information, improves resource utilization, and reduces user storage requirements and implementation complexity.

As another optional embodiment, in the foregoing embodiment of the present disclosure, the method further includes:

obtaining resource configuration information, where the resource configuration information is used to indicate a first resource; and determining an available resource in the first resource according to the resource configuration information. Optionally, the available resource may also be referred to as a resource available for sidelink transmission, and does not include a sidelink synchronization resource.

A bit in the resource bitmap corresponds to the available resource; and a unit of the available resource is millisecond or slot.

Optionally, this embodiment of the present disclosure does not limit the existing orders of the step of obtaining resource configuration information and the step of obtaining resource indication information, that is, first obtaining the resource configuration information, and then obtaining the resource indication information; or first obtaining the resource indication information, and then obtaining the resource configuration information; or obtaining both the resource indication information and the resource configuration information at the same time, all of which are applicable to this application, and are not specifically limited herein.

Optionally, the resource configuration information is obtained by at least one of configuring by a control node, pre-configuration, pre-definition (such as protocol definition), instructing from other terminals, or determining by the terminal itself.

The foregoing control node may be a base station (for example, an eNB, a gNB, or another network device), or may be a node having a scheduling ability (for example, a road side unit RSU) or a terminal having an ability to schedule another user.

In the foregoing embodiment of the present disclosure, the first resource may include an available resource and/or an unavailable resource, and the available resource contained in the first resource corresponds to the bit in the resource bitmap.

The available resource is a resource including enough uplink symbols or an uplink resource. Alternatively, for example, an uplink slot, or a slot including an uplink symbol that meets a preset requirement. Optionally, the available resource may be understood as a resource that may be used for SL transmission. Alternatively, the available resource may be understood as a resource that may be used for SL transmission and that is not a sidelink synchronization resource.

Optionally, the sidelink synchronization resource may be understood as a resource used for transmitting a sidelink synchronization signal. Alternatively, the sidelink synchronization resource is a resource used for transmitting an SLSS (Sidelink Synchronization Signal), for example, a subframe or a slot in which the SLSS or an S-SSB (sidelink-synchronization signal block) is located. Alternatively, the sidelink synchronization resource may be a resource corresponding to at least one of a parameter SL-SSB-TimeAllocation (sidelink synchronization signal block time allocation) and a parameter syncoffsetindicator (synchronization offset indicator).

The unavailable resource is at least one of a resource that does not include an uplink symbol meeting a preset requirement (or referred to as a resource where a quantity of uplink resources contained does not meet the preset requirement), a downlink resource, a flexible (flexible) resource, and a resource used for SLSS transmission. Optionally, the unavailable resource may be understood as a resource that cannot be used for SL transmission. Alternatively, the available resource may be understood as a resource that may not be used for SL transmission and a resource that is used for a sidelink synchronization resource.

Optionally, the preset requirement is that symbols X~(X+Y−1) are uplink symbols, or, symbols X~(X+Y−1) are used for SL.

The sidelink synchronization signal mentioned in the embodiment of the present disclosure includes at least one of an NR sidelink synchronization signal and an LTE sidelink synchronization signal.

The sidelink synchronization resource mentioned in the embodiment of the present disclosure includes at least one of an NR sidelink synchronization resource and an LTE sidelink synchronization resource.

Correspondingly, the determining an available resource in the first resource according to the resource configuration information includes:

determining, according to the resource configuration information, a resource other than at least one of an unavailable resource and a target sidelink synchronization resource in the first resource as the available resource.

Preferably, the resource other than at least one of the unavailable resource and the target sidelink synchronization resource in the first resource is determined as the available resource.

Optionally, the target sidelink synchronization resource mentioned in the embodiment of the present disclosure includes at least one of an NR target sidelink synchronization resource and an LTE target sidelink synchronization resource.

The target sidelink synchronization resource or the sidelink synchronization resource refer to: a resource used for transmitting a sidelink synchronization signal.

The available resource mentioned in the embodiment of the present disclosure may be a candidate resource or a resource actually used for transmission, and the unavailable resource mentioned in the embodiment of the present disclosure may be a candidate unavailable resource or an actual unavailable resource. For example, the sidelink synchronization resource is a synchronization resource actually used for transmitting a sidelink synchronization signal, and in this case, these resources cannot transmit sidelink data, so the sidelink synchronization resource can be excluded when the available resource is determined. For another example, the sidelink synchronization resources are candidate synchronization resources that may be used for the sidelink synchronization signal. Regardless of whether they are actually used for transmitting the sidelink synchronization signal, in this case, these resources may not be able to transmit sidelink data, so these sidelink synchronization resources need to be excluded when the available resource is determined.

As an optional embodiment, there is a correspondence between the resource indication information and at least one of the following information:

a synchronization reference (synchronization reference), or referred to as a synchronization source; for example, different synchronization references correspond to their respective resource indication information; for another example, different synchronization priorities correspond to their respective resource indication information;

a sidelink synchronization signal identifier SLSSID, that is, an ID carried by a sidelink synchronization signal SLSS; for example, different SLSSIDs or different SLSSID groups correspond to respective resource indication information;

a coverage status, that is, within coverage or outside coverage; for example, within coverage or outside coverage corresponds to their respective resource indication information; further, the coverage status is a coverage status of a synchronization source with a preset type, and a type of the synchronization source may be at least one of a base station, a global navigation satellite system GNSS, and a terminal; for example, a user within the coverage of the base station obtains resource indication information 1 corresponding to within the coverage, and for another example, a user outside the coverage of the base station obtains resource indication information 2 corresponding to outside the coverage;

a subcarrier spacing; for example, different subcarrier spacings correspond to respective resource indication information;

a time division duplexing TDD period; for example, different periods correspond to different possible values of the length of the resource bitmap;

an available resource period; for example, different periods correspond to different possible values of the length of the resource bitmap;

an unavailable resource period; for example, different periods correspond to different possible values of the length of the resource bitmap;

a quantity of available resources; where the quantity of available resources may be a quantity of available resources within a certain period of time, for example, a quantity of available resources in a certain period or pattern, and a quantity of available resources in different periods or patterns may be the same or different, which is not limited herein;

a quantity of unavailable resources; where the quantity of unavailable resources may be a quantity of unavailable resources within a certain period of time, for example, a quantity of unavailable resources in a certain period or pattern, and a quantity of unavailable resources in different periods or patterns may be the same or different, which is not limited herein;

a quantity of synchronization resources; and a quantity of resources contained in synchronization resources and used for transmitting a sidelink synchronization signal.

Optionally, the quantity of synchronization resources may be one, or may be two or more than two, and the quantity of resources contained in different synchronization resources and used for transmitting sidelink synchronization signals may be the same or different. For example, a synchronization resource 1 includes 8 slots used for transmitting sidelink synchronization signals, and a synchronization resource 2 includes 2 slots used for transmitting sidelink synchronization signals.

For example, when the SCS is 15 kHz, possible values of the length L of the resource bitmap are {1, 2, 4, 8, 24, 32, 64, 128};

for another example, when the SCS is 30 kHz, possible values of the length L of the resource bitmap are {1, 2, 4, 8, 24, 32, 64, 128, 256};

for another example, when the SCS is 60 kHz, possible values of the length L of the resource bitmap are {1, 2, 4, 8, 24, 32, 64, 128, 256, 512}; and for another example, when the SCS is 120 kHz, possible values of the length L of the resource bitmap are {1, 2, 4, 8, 24, 32, 64, 128, 256, 512, 1,024, 2,048}.

As another optional embodiment of the present disclosure, the method further includes:

determining, according to a first formula, a quantity V of available resources, where the first formula is:

$$V=(D*2^\mu-L_{SLSS}-(D*M)/T)*(P_{SL}/D)$$

$\mu$ is equal to $\log_2$ (SCS/A); $L_{SLSS}$ represents a quantity of resources contained in one or more target sidelink synchronization resources and used for transmitting a sidelink synchronization signal; T represents a time division duplexing period, an available resource period, an unavailable resource period, or a preset period (optionally, the preset period is 20 ms); M represents a quantity of unavailable resources in a period T; $P_{SL}$ represents a time length of the target time period; SCS represents a sidelink subcarrier spacing; A represents a reference subcarrier spacing; and D represents a time length of a reference time period (optionally, the reference time period is 160 ms).

For example, A=15 kHz, 30 kHz or 60 kHz. Preferably, A=15 kHz.

The quantity of available resources may be a quantity of available resources within a certain period of time, for example, a quantity of available resources in a certain period or pattern, and a quantity of available resources in different periods or patterns may be the same or different, which is not limited herein.

Optionally, a possible implementation is that the reference time period is an SLSS (sidelink synchronization signal block) period or an integer multiple of the SLSS period, for example, D=160 ms.

Optionally, a possible implementation is that the target time period is 1,024 frames, for example, $P_{SL}$=10,240 ms. In this case, a quantity of available slots within $P_{SL}$ is: V=(160*2$^\mu$-$L_{SLSS}$-(160*M)/T)*(10,240/160)=(160*2$^\mu$-$L_{SLSS}$-(160*M)/T)*64.

Optionally, in an implementation, units of D, T and $P_{SL}$ in (D*M)/T and ($P_{SL}$/D) in the formula are millisecond (ms); and D*2$^\mu$ in the formula is a value after D is converted into a unit of slot. In another implementation, units of D, T and $P_{SL}$ may by slot or another unit; if units of these parameters in a formula are different, these parameters need to be converted into unified units before obtaining a calculation result. For example, if the units of D, T and $P_{SL}$ in (D*M)/T and ($P_{SL}$/D) are uniformly converted into slots, the value in millisecond needs to be multiplied by 2$^\mu$.

Optionally, in a specific application, the first formula includes at least one of the following rounding operations, and the rounding operations may be upward rounding or downward rounding:

performing rounding on a calculation result of ($P_{SL}$/D);

performing rounding on a calculation result of (D*M)/T; and performing rounding on an overall calculation result of (D*2$^\mu$-$L_{SLSS}$-(D*M)/T)*($P_{SL}$/D).

As an optional embodiment, a quantity of available resources is an integer multiple of the length of the resource bitmap. That is, the length L of the resource bitmap is divided by a quantity V of available resources; for example, L is equal to 64.

As another optional embodiment, the target sidelink synchronization resource includes at least one of the following:

a sidelink synchronization resource of a bandwidth part BWP to which the determined resource used for sidelink transmission belongs; for example, when it is determined that a target sidelink synchronization resource belongs to resources of a sidelink resource pool of a BWP j, the target sidelink synchronization resource is a sidelink synchronization resource of the BWP j;

a sidelink synchronization resource of all activated BWPs in a carrier to which the determined resource used for sidelink transmission belongs; for example, when it is determined that a target sidelink synchronization resource belongs to resources of a sidelink resource pool of a BWP j in a carrier k, the target sidelink synchronization resource is a sidelink synchronization resource of all activated BWPs in the carrier k;

a sidelink synchronization resource of all BWPs in a carrier to which the determined resource used for sidelink transmission belongs; for example, when it is determined that a target sidelink synchronization resource belongs to resources of a sidelink resource pool of a BWP j in a carrier k, the target sidelink synchronization resource is a sidelink synchronization resource of all BWPs in the carrier k;

a sidelink synchronization resource in a carrier to which the determined resource used for sidelink transmission belongs; for example, when it is determined that a target sidelink synchronization resource belongs to resources of a sidelink resource pool in a carrier k, the target sidelink synchronization resource is a sidelink synchronization resource in the carrier k;

a sidelink synchronization resource in a first carrier, where the first carrier is all carriers that are configured or pre-configured by a terminal and that can be used for sidelink transmission.

Optionally, in the foregoing embodiment of the present disclosure, for the second resource, the target sidelink synchronization resource is at least one of a target sidelink synchronization resource used for receiving sidelink synchronization and a target sidelink synchronization resource used for sending sidelink synchronization.

Optionally, in the foregoing embodiment of the present disclosure, for the third resource, the target sidelink synchronization resource is at least one of a target sidelink synchronization resource used for sending sidelink synchronization and a target sidelink synchronization resource used for receiving sidelink synchronization.

Optionally, the target sidelink synchronization resource mentioned in the embodiment of the present disclosure includes at least one of an NR target sidelink synchronization resource and an LTE target sidelink synchronization resource.

For example, a control node provides information on the LTE target sidelink synchronization resource (for example, a quantity of sidelink synchronization resources used for LTE SLSS transmission, and/or time domain locations of sidelink synchronization resources used for LTE SLSS transmission), and the target sidelink synchronization resources at least include the LTE target sidelink synchronization resource.

For another example, a control node provides information on the NR target sidelink synchronization resource (for example, a quantity of sidelink synchronization resources used for NR SLSS transmission, and/or a quantity of resources used for NR SLSS transmission within the sidelink synchronization resources) and information on the LTE target sidelink synchronization resource (for example, a quantity of sidelink synchronization resources used for LTE SLSS transmission, and/or time domain location of sidelink synchronization resources used for LTE SLSS transmission), and the target sidelink synchronization resources include the NR target sidelink synchronization resource and the LTE target sidelink synchronization resource.

Optionally, in the foregoing embodiment of the present disclosure, that a bit in the resource bitmap corresponds to the available resource includes:

each bit in the resource bitmap corresponds to available resources of U time unit; and U is greater than or equal to 1.

The time unit may be millisecond or slot. Optionally, U=1, or U is an integer multiple of the precision indicated by the resource configuration information (for example, if the precision of the resource configuration information is 2, then U=2).

Optionally, if a frequency for SL communication or transmission is located in an FR1, then U=2;

Optionally, if a frequency for SL communication or transmission is located in an FR2, then U=4;

Optionally, U is an integer multiple of the precision of the resource configuration information. Optionally, U is an integer multiple of the precision configured by the resource configuration information. For example, if the resource configuration information indicates that the precision of the resource is 8 slots, then U=8; for example, if the resource configuration information indicates that the precision of the resource is 4 slots, then U=4; for example, if the resource configuration information indicates that the precision of the resource is 2 slots, then U=2; and for example, if the resource configuration information indicates that the precision of the resource is 1 slot, then U=1. Alternatively, for example, if the resource configuration information is SL-TDD-Config, and the precision when the SL-TDD-Config indicates resources is 2 slots, or a quantity of resources indicated by the SL-TDD-Config is a multiple of 2 slots, or a minimum difference between the quantity of resources that can be indicated by the SL-TDD-Config is 2 slots, U=2.

In the foregoing description, if the precision configured by the resource configuration information is G, which may be interpreted as that the quantity of resources indicated by the resource configuration information is a multiple of G, or may also be interpreted as that the minimum difference between the quantity of resources that can be indicated by the resource configuration information is G. The precision is G, which may be G slots or G milliseconds.

For example, the resource configuration information indicates that the precision of the resource is 8 slots, then U=8.

For example, the resource configuration information indicates that the precision of the resource is 4 slots, then U=4.

For example, the resource configuration information indicates that the precision of the resource is 2 slots, then U=2.

For example, the resource configuration information indicates that the precision of the resource is 1 slot, then U=1.

Optionally, $U=2^\mu$; $\mu=\log_2(SCS/A)$, SCS represents a sidelink subcarrier spacing; A represents a reference subcarrier spacing, for example, A=15 kHz, 30 kHz or 60 kHz. If A=15 kHz, that is, each ms indicated by the resource configuration information corresponds to a bit in the resource indication information. For example, if SL SCS=30 kHz, then $U=2^\mu=2^1=2$, and in this case, every two slots respectively corresponds to one bit in the resource bitmap.

Correspondingly, in Step 102, the determining, according to the resource indication information, a resource used for sidelink transmission includes:

if a bit value of the resource bitmap corresponding to the available resource is a first value (the first value is 0 or 1), determining that the available resource is a resource used for sidelink transmission.

As an optional embodiment, the resource configuration information includes at least one of the following:

uplink and downlink resource configuration information; for example, TDD-UL-DL-configCommon (time division duplexing uplink downlink common configuration), and/or TDD-UL-DL-configDedicated (time division duplexing uplink downlink dedicated configuration); and sidelink resource configuration information; for example, SL-TDD-config (sidelink time division duplexing configuration).

Preferably, the resource configuration information is SL-TDD-Config.

For example, the available resource in the first resource indicated by the SL-TDD-config corresponds to the bit of the resource bitmap, so as to determine the resource used for sidelink transmission. Alternatively, assuming that the SL-TDD-config indicates that a resource period is 10 ms, and there are 10 available resources (slots) and 10 unavailable resources (slots) within 10 ms, then these 10 available resources correspond to at least some of the bits in the bitmap, and the resources used for sidelink transmission are determined according to indication of the resource bitmap.

For example, if a synchronization source of a terminal is another terminal outside the coverage, the terminal may obtain the available resources according to the TDD-UL-DL-configcommon or SL-TDD-Config in the pre-configuration.

For example, if a synchronization source of a terminal is another terminal within the coverage but the terminal is outside the coverage, the available resources may be obtained based on the obtained SL-TDD-Config.

For example, if a terminal is within the coverage, or the terminal is within the coverage and a synchronization source of the terminal is another terminal or base station within the coverage, the available resources may be obtained based on the TDD-UL-DL-configcommon of SIB.

For example, if a terminal is in a connected state, and/or a synchronization source of the terminal is a connected-state terminal within the coverage, the available resources may be obtained based on the TDD-UL-DL-configcommon of a system information block SIB. Optionally, in the foregoing embodiment of the present disclosure, the obtaining resource configuration information includes any one of the following:

determining, by the terminal, its own resource configuration information;

receiving a broadcast message, where the broadcast message carries the resource configuration information; for example, a sidelink broadcast channel PSBCH, or a main information block MIB carried by the PSBCH;

receiving a sidelink system information block SIB, where the sidelink system information block carries the resource configuration information; that is, an SIB carrying sidelink related configuration information, such as SIB X;

receiving sidelink radio resource control RRC signaling, where the sidelink RRC signaling carries the resource configuration information; that is, RRC signaling carrying sidelink related configuration information, such as NR sidelink dedicated configuration signaling (SL-ConfigDedicatedNR), and/or PC5 RRC signaling, such as RRC sidelink reconfiguration signaling (RRCReconfigurationSidelink) or RRC sidelink reconfiguration completion signaling (RRCReconfigurationCompleteSidelink);

obtaining pre-configured resource configuration information; and obtaining predefined (for example, defined by a protocol) resource configuration information.

Optionally, the method for the terminal determining its own resource configuration information is determining its own resource configuration information according to at least one of the following information:

SL-TDD-config determined based on TDD-UL-DL-configCommon;

SL-TDD-config contained in the obtained physical sidelink broadcast channel PSBCH;

SL-TDD-config contained in the obtained sidelink system information block;

SL-TDD-config contained in the obtained sidelink RRC signaling;

pre-configured SL-TDD-config; and predefined SL-TDD-config.

Optionally, the correspondence between the bit in the resource bitmap and the available resource includes:

a bit i in the resource bitmap corresponds to an available resource i', where i=i' mod L, and L represents the length of the resource bitmap. mod represents a modulo operation. i represents the number of a certain bit in the resource bitmap; and i' represents the number of the available resource in the first resource.

In the embodiments of the present disclosure, the resource indication information carries at least one of the at least one target time period, the at least one resource bitmap, and the period of the at least one resource bitmap; and the terminal can determine, according to the resource indication information, a resource used for sidelink transmission or a resource used for sidelink transmission within the target time period, thereby implementing sidelink transmission.

In order to describe the foregoing resource determining method provided in the embodiments of the present disclosure more clearly, the resource determining method is described below with reference to several examples.

Example 1: A Target Sidelink Synchronization Resource

The target sidelink synchronization resource is a synchronization resource belonging to a same BWP or carrier as the determined resource of a resource pool used for sidelink transmission;

Alternatively, when it is determined that the target sidelink synchronization resource belongs to resources of a sidelink resource pool i of a BWP j, the target sidelink synchronization resource is an SL synchronization resource of the BWP j; for example, when determining the resources of the sidelink resource pool i of the BWP j, the sidelink synchronization resources of the BWP j are not available resources (that is, not belonging to the sidelink resource pool i). For another example, when determining the resources of the sidelink resource pool i of the BWP j, a time domain location where the sidelink synchronization resource of BWP j' is located is considered to be an available resource.

Alternatively, when it is determined that the target sidelink synchronization resource belongs to resources of a sidelink resource pool i of a BWP j in a carrier k, the target sidelink synchronization resource is a sidelink synchronization resource of all activated BWPs in the carrier k;

for example, when determining the resources of the sidelink resource pool i of the BWP j in the carrier k, the sidelink synchronization resources belonging to an activated BWP j' in the carrier k are also not available resources (that is, not belonging to the sidelink resource pool i).

Alternatively, when it is determined that the target sidelink synchronization resource belongs to resources of a resource pool i of a BWP j in a carrier k, the target sidelink synchronization resource is a sidelink synchronization resource of all BWPs in the carrier k;

for example, when determining the resources of the sidelink resource pool i of the BWP j in the carrier k, the sidelink synchronization resources belonging to a BWP j' in the carrier k are also not available resources (that is, not belonging to the sidelink resource pool i).

For example, a control node provides information on the LTE target sidelink synchronization resource (for example, a quantity of sidelink synchronization resources used for LTE SLSS transmission, and/or time domain locations of sidelink synchronization resources used for LTE SLSS transmission), and the target sidelink synchronization resources at least include the LTE target sidelink synchronization resource.

For another example, a control node provides information on the NR target sidelink synchronization resource (for example, a quantity of sidelink synchronization resources used for NR SLSS transmission, and/or a quantity of resources used for NR SLSS transmission within the sidelink synchronization resources) and information on the LTE target sidelink synchronization resource (for example, a quantity of sidelink synchronization resources used for LTE SLSS transmission, and/or time domain location of sidelink synchronization resources used for LTE SLSS transmission), and the target sidelink synchronization resources include the NR target sidelink synchronization resource and the LTE target sidelink synchronization resource.

Example 2

Assuming that an SLSS period is 160 ms, there are two synchronization resources in one SLSS period, and each synchronization resource respectively includes L1 and L2 slots for SLSS transmission. SCS=120 kHz is taken as an example. There are M resources not used for SL within a 20 ms period.

Therefore, a quantity of available resources (slots) within 160 ms is 160*8-L1-L2-M*8. So that a quantity of available resources (slots) within 1,024 frames is (160*8-L1-L2-M*8)*64, and it is at least an integer multiple of 64. In addition, when the length L of the resource bitmap (bitmap) may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Optionally, if L1+L2=2, the quantity of available resources must be an integer multiple of 128, so the length of the bitmap may be at least 128 or a factor of 128.

Optionally, if L1+L2=3, the quantity of available resources must be an integer multiple of 64, so the length of the bitmap may be at least 64 or a factor of 64.

Optionally, if L1+L2=4, the quantity of available resources must be an integer multiple of 256, so the length of the bitmap may be at least 256 or a factor of 256.

Optionally, if L1+L2=5, the quantity of available resources must be an integer multiple of 64, so the length of the bitmap may be at least 64 or a factor of 64.

Optionally, if L1+L2=6, the quantity of available resources must be an integer multiple of 128, so the length of the bitmap may be at least 128 or a factor of 128.

Optionally, if L1+L2=8, the quantity of available resources must be an integer multiple of 512, so the length of the bitmap may be at least 512 or a factor of 512.

Optionally, if L1+L2=9, the quantity of available resources must be an integer multiple of 64, so the length of the bitmap may be at least 64 or a factor of 64.

Optionally, if L1+L2=10, the quantity of available resources must be an integer multiple of 128, so the length of the bitmap may be at least 128 or a factor of 128.

Optionally, if L1+L2=12, the quantity of available resources must be an integer multiple of 256, so the length of the bitmap may be at least 256 or a factor of 256.

Optionally, if L1+L2=16, the quantity of available resources must be an integer multiple of 512, so the length of the bitmap may be at least 512 or a factor of 512.

Optionally, if L1+L2=17, the quantity of available resources must be an integer multiple of 64, so the length of the bitmap may be at least 64 or a factor of 64.

Optionally, if L1+L2=18, the quantity of available resources must be an integer multiple of 128, so the length of the bitmap may be at least 128 or a factor of 128.

Optionally, if L1+L2=20, the quantity of available resources must be an integer multiple of 256, so the length of the bitmap may be at least 256 or a factor of 256.

Optionally, if L1+L2=24, the quantity of available resources must be an integer multiple of 512, so the length of the bitmap may be at least 512 or a factor of 512.

Optionally, if L1+L2=32, the quantity of available resources must be an integer multiple of 512, so the length of the bitmap may be at least 512 or a factor of 512.

Optionally, if L1+L2=33, the quantity of available resources must be an integer multiple of 64, so the length of the bitmap may be at least 64 or a factor of 64.

Optionally, if L1+L2=34, the quantity of available resources must be an integer multiple of 128, so the length of the bitmap may be at least 128 or a factor of 128.

Optionally, if L1+L2=36, the quantity of available resources must be an integer multiple of 256, so the length of the bitmap may be at least 256 or a factor of 256.

Optionally, if L1+L2=40, the quantity of available resources must be an integer multiple of 512, so the length of the bitmap may be at least 512 or a factor of 512.

Optionally, if L1+L2=48, the quantity of available resources must be an integer multiple of 512, so the length of the bitmap may be at least 512 or a factor of 512.

Optionally, if L1+L2=64, the quantity of available resources must be an integer multiple of 512, so the length of the bitmap may be at least 512 or a factor of 512.

Optionally, if L1+L2=65, the quantity of available resources must be an integer multiple of 64, so the length of the bitmap may be at least 64 or a factor of 64.

Optionally, if L1+L2=66, the quantity of available resources must be an integer multiple of 128, so the length of the bitmap may be at least 128 or a factor of 128.

Optionally, if L1+L2=68, the quantity of available resources must be an integer multiple of 256, so the length of the bitmap may be at least 256 or a factor of 256.

Optionally, if L1+L2=72, the quantity of available resources must be an integer multiple of 512, so the length of the bitmap may be at least 512 or a factor of 512.

Optionally, if L1+L2=96, the quantity of available resources must be an integer multiple of 512, so the length of the bitmap may be at least 512 or a factor of 512.

Optionally, if L1=L2, the quantity of available resources must be an integer multiple of 128, so the length of the bitmap may be at least 128 or a factor of 128.

Example 3

Assuming that an SLSS period is 160 ms, there are two synchronization resources used for SLSS transmission in one SLSS period, and each synchronization resource respectively includes L1 and L2 slots for SLSS transmission. SCS=60 kHz is taken as an example. There are M resources not used for SL within a 20 ms period.

Therefore, a quantity of available resources (slots) within 160 ms is 160*4-L1-L2-M*8. Thus, a quantity of available resources (slots) within 1,024 frames is (160*4-L1-L2-M*8)*64, and it is at least an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Optionally, if L1+L2=2, the quantity of available resources must be an integer multiple of 128, so the length of the bitmap may be at least 128 or a factor of 128.

Optionally, if L1+L2=3, the quantity of available resources must be an integer multiple of 64, so the length of the bitmap may be at least 64 or a factor of 64.

Optionally, if L1+L2=4, the quantity of available resources must be an integer multiple of 256, so the length of the bitmap may be at least 256 or a factor of 256.

Optionally, if L1+L2=5, the quantity of available resources must be an integer multiple of 64, so the length of the bitmap may be at least 64 or a factor of 64.

Optionally, if L1+L2=6, the quantity of available resources must be an integer multiple of 128, so the length of the bitmap may be at least 128 or a factor of 128.

Optionally, if L1+L2=8, the quantity of available resources must be an integer multiple of 512, so the length of the bitmap may be at least 512 or a factor of 512.

Optionally, if L1+L2=9, the quantity of available resources must be an integer multiple of 64, so the length of the bitmap may be at least 64 or a factor of 64.

Optionally, if L1+L2=10, the quantity of available resources must be an integer multiple of 128, so the length of the bitmap may be at least 128 or a factor of 128.

Optionally, if L1+L2=12, the quantity of available resources must be an integer multiple of 256, so the length of the bitmap may be at least 256 or a factor of 256.

Optionally, if L1+L2=16, the quantity of available resources must be an integer multiple of 512, so the length of the bitmap may be at least 512 or a factor of 512.

Optionally, if L1=L2, the quantity of available resources must be an integer multiple of 128, so the length of the bitmap may be at least 128 or a factor of 128.

Example 4

Assuming that an SLSS period is 160 ms, there are two synchronization resources used for SLSS transmission in one SLSS period, and each synchronization resource respectively includes L1 and L2 slots for SLSS transmission. SCS=30 kHz is taken as an example. There are M resources not used for SL within a 20 ms period.

Therefore, a quantity of available resources (slots) within 160 ms is 160*2-L1-L2-M*8. So that a quantity of available resources (slots) within 1,024 frames is (160*2-L1-L2-M*8)*64, and it is at least an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Optionally, if L1+L2=2, the quantity of available resources must be an integer multiple of 128, so the length of the bitmap may be at least 128 or a factor of 128.

Optionally, if L1+L2=3, the quantity of available resources must be an integer multiple of 64, so the length of the bitmap may be at least 64 or a factor of 64.

Optionally, if L1+L2=4, the quantity of available resources must be an integer multiple of 256, so the length of the bitmap may be at least 256 or a factor of 256.

Example 5

Assuming that an SLSS period is 160 ms, there are two synchronization resources used for SLSS transmission in one SLSS period, and each synchronization resource respectively includes L1 and L2 slots for SLSS transmission. SCS=15 kHz is taken as an example. There are M resources not used for SL within a 20 ms period.

Therefore, a quantity of available resources (slots) within 160 ms is 160-L1-L2-M. Thus, a quantity of available resources (slots) within 1,024 frames is (160-L1-L2-M*8)*64, and it is at least an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Optionally, if L1=L2, the quantity of available resources must be an integer multiple of 128, so the length of the bitmap may be at least 128 or a factor of 128.

Example 6

Assuming that an SLSS period is 160 ms, there are three synchronization resources used for SLSS transmission in one SLSS period, and each synchronization resource respectively includes L1, L2 and L3 slots for SLSS transmission. SCS=120 kHz is taken as an example. There are M resources not used for SL within a 20 ms period.

Therefore, a quantity of available resources (slots) within 160 ms is 160*8-L1-L2-L3-M*8. Thus, a quantity of available resources (slots) within 1,024 frames is (160*8-L1-L2-L3-M*8)*64, and it is at least an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Optionally, if L1+L2+L3=4, the quantity of available resources is still an integer multiple of 256, so the length of the bitmap may be at least 512 or a factor of 512.

Optionally, if L1+L2+L3=8, the quantity of available resources is still an integer multiple of 512, so the length of the bitmap may be at least 512 or a factor of 512.

Optionally, if L1+L2+L3=16, the quantity of available resources is still an integer multiple of 512, so the length of the bitmap may be at least 512 or a factor of 512.

Optionally, if L1+L2+L3=32, the quantity of available resources is still an integer multiple of 512, so the length of the bitmap may be at least 512 or a factor of 512.

Optionally, if L1+L2+L3=64, the quantity of available resources is still an integer multiple of 512, so the length of the bitmap may be at least 512 or a factor of 512.

Optionally, if L1=L2=L3, the value is still an integer multiple of 64, so the length of the bitmap may be at least 64 or a factor of 64.

Example 7

Assuming that an SLSS period is 160 ms, only one synchronization resource is considered when determining the resource, and the synchronization resource includes L1 slots for SLSS transmission. SCS=120 kHz is taken as an example. There are M resources not used for SL within a 20 ms period.

Therefore, a quantity of available resources (slots) within 160 ms is 160*8-L1-M*8. Thus, a quantity of available resources (slots) within 1,024 frames is (160*8-L1-M*8)*64, and it is at least an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Advantages of this method are that there is no need to define reserved resources like LTE, which simplifies design and improves resource utilization.

Further optionally, if L1=1, the quantity of available resources is still an integer multiple of 64, so the length of the bitmap may be at least 64 or a factor of 64.

Further optionally, if L1=2, the quantity of available resources is still an integer multiple of 128, so the length of the bitmap may be at least 128 or a factor of 128.

Further optionally, if L1=4, the quantity of available resources is still an integer multiple of 256, so the length of the bitmap may be at least 256 or a factor of 256.

Further optionally, if L1=8, 16, 32, or 64, the quantity of available resources is still an integer multiple of 512, so the length of the bitmap may be at least 512 or a factor of 512.

Example 8

Assuming that an SLSS period is 160 ms, TDD configuration includes one TDD pattern and the period is T. Therefore, an available resource period is also T, and it is assumed that one resource period includes M resources not used for SL. For example, T=20 ms, there are 20/T*M resources not used for SL within a 20 ms period.

It is assumed that no matter how many synchronization resources are considered, a total of $L_{SSB}$ slots for SLSS transmission are included in one 160 ms.

SCS=120 kHz is taken as an example, and a quantity of available resources (slots) within 160 ms is 160*8-LSSB-20/T*M*8=160*8-LSSB-(160*M)/T. Therefore, in this case, a quantity of available resources (slots) within 1,024 frames is (160*8-LSSB-(160*M)/T)*64, and it is an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Alternatively, if T=1 ms, the quantity of available resources (slots) within 1,024 frames is (160*8-LSSB-(160*M))*64; and if LSSB=32, the quantity of available resources within 1,024 frames is an integer multiple of 2,048. The length L of the bitmap may be at least 2,048 or a factor thereof.

Alternatively, if T=10 ms, the quantity of available resources (slots) within 1,024 frames is (160*8-LSSB-(16*M))*64; and if LSSB=32, the quantity of available resources within 1,024 frames is an integer multiple of 1,024. The length L of the bitmap may be at least 1,024 or a factor thereof.

Alternatively, assuming that TDD configuration includes two TDD patterns and the periods are T1 and T2 respectively. Therefore, an available resource period is T=T1+T2, and it is assumed that there are M1 and M2 resources not used for SL in the two patterns respectively, M1+M2=M. Therefore, one resource period T includes M resources not used for SL. For example, T=20 ms, there are 20/T*M resources not used for SL within a 20 ms period.

It is assumed that no matter how many synchronization resources are considered, a total of $L_{SSB}$ slots for SLSS transmission are included in one 160 ms. SCS=120 kHz is taken as an example, and a quantity of available resources (slots) within 160 ms is 160*8-LSSB-20/T*M*8=160*8-LSSB-(160*M)/T. Therefore, in this case, a quantity of available resources (slots) within 1,024 frames is (160*8-LSSB-(160*M)/T)*64, and it is an integer multiple of 64. When the length L of the bitmap may be at least 64 or a factor thereof, the quantity of available resources (slots) within 1,024 frames may be divided evenly. That is, the bitmap may repeatedly map an integer multiple on the available resources.

Alternatively, if T1=T2=0.5 ms and T=1 ms, the quantity of available resources (slots) within 1,024 frames is (160*8-LSSB-(160*M))*64; and if LSSB=32, the quantity of available resources within 1,024 frames is an integer multiple of 2,048. The length L of the bitmap may be at least 2,048 or a factor thereof.

Alternatively, if T1=T2=5 ms and T=10 ms, the quantity of available resources (slots) within 1,024 frames is (160*8-LSSB-(16*M))*64; and if LSSB=32, the quantity of available resources within 1,024 frames is an integer multiple of 1,024. The length L of the bitmap may be at least 1,024 or a factor thereof.

Example 9

For the time length $P_{SL}$ of the target time period.

Optionally, $P_{SL} \geq L$, L is the length of the resource bitmap; and optionally, $P_{SL}=A*L$, where A is a positive integer. A preferred solution is that A is equal to 1, in which case $P_{SL}$ is equal to L.

Optionally, $P_{SL} \geq 80$; and optionally, $P_{SL}=B*80$, where B a positive integer.

Optionally, $P_{SL} \geq 160$; and $P_{SL}=C*160$, where C a positive integer.

Optionally, each target time period corresponds to a same resource bitmap or a different resource bitmap.

Example 10: The Resource Indication Information Includes One or More Resource Bitmaps When there are I resource bitmaps, possible methods for determining a resource pool include:

applying a resource bitmap i in a target time period i; where the applying a resource bitmap i in a target time period i may be understood as: bits of the resource bitmap i map or correspond to available resources in the target time period i.

Alternatively, for each target time period, applying a resource bitmap 0 to a resource bitmap I-1 in a sequence of numbers;

alternatively, successively applying a resource bitmap 0 to a resource bitmap I-1. The successively applying the resource bitmap may be understood as: successively mapping or corresponding bits of different resource bitmaps to available resources.

In the foregoing methods, if integer times of mappings or correspondences cannot be completed, for example, after H mappings are completed, the remaining remainder resources cannot complete a complete mapping, the bitmap will not continue to be mapped to the remainder, and/or the remainder resources do not belong to the sidelink resource pool.

For example, the time length of the target time period $P_{SL}=1,280$ ms, there are 8 periods in 1,024 frames, each period corresponds to an 8-bit bitmap, there are 8 periods in 10,240 ms, so a total of 8 8-bit bitmaps are configured and recorded as bitmap 0-7. In this case, the applying method includes at least one of the following:

Method 1: Only a bitmap i may be applied in a period i; for example, the bitmap i is repeatedly mapped in the period i to determine which resources in the period i belong to the sidelink resource pool;

Method 2: Traversing each period, and repeatedly applying each period in a sequence of the bitmaps 0-7; in fact, it is equivalent to implementing a 64-bit bitmap. For example, in the period i, the bitmaps 0-7 are mapped. Optionally, if there are resources that allow multiple mappings within a certain period, the mappings are repeated in the sequence of the bitmaps 0-7.

Method 3: Repeating the mapping in the sequence of the bitmaps 0-7; further, it is allowed to map a bitmap across multiple periods, for example, some bits in a bitmap i correspond to resources in a period j, and another part of bits corresponds to resources in a period j+1.

Example 11

The terminal determines the resources according to the resource configuration information, and determines the available resources after excluding the unavailable resources. The unavailable resources include at least one of downlink resources, flexible resources, and resources that include uplink symbols but do not meet a preset requirement, and belong to the sidelink synchronization resources (that is, resources used for SLSS transmission).

For example, after excluding the downlink resources and the SLSS resources, the remaining resources are available resources. The user applies the resource indication information to the available resources. Alternatively, after excluding the downlink resources and the SLSS resources, there are 6,400 available slots, and L=64; and for a slot i, if a value of i mod 64 in the bitmap is a first value, the slot belongs to the sidelink resource pool.

Alternatively, for example, an available slot 128 corresponds to a bit 0 in the bitmap, and if the bit is a first value, such as 1, the slot 128 belongs to the sidelink resource pool.

For another example, after excluding the downlink resources, the flexible resources and the SLSS resources, the remaining resources are available resources. The user applies the resource indication information to the available resources. Alternatively, after excluding the downlink resources, the flexible resources and the SLSS resources, there are 6,400 available slots, and L=64; and for a slot i, if a value of i mod 64 in the bitmap is a first value, such as 1, the slot belongs to the sidelink resource pool.

Alternatively, for example, an available slot 128 corresponds to a bit 0 in the bitmap, and if the bit is 1, the slot 128 belongs to the sidelink resource pool.

For another example, after excluding the SLSS resources, the resources not including uplink symbols, and the resources including uplink symbols but the quantity of the included uplink symbols not meeting the preset requirement, the remaining resources are available resources. The user applies the resource indication information to the available resources.

Alternatively, the preset requirement is that SL transmission occupies symbols 0-11 in one slot. After excluding the resources not including uplink symbols (for example, the downlink resources, and the flexible resources), the SLSS resources, and the resources including uplink symbols but the included uplink symbols not completely including symbols 0-11, there are 6,400 available slots, and L=64; and for a slot i, if a value of i mod 64 in the bitmap is a first value, such as 1, the slot belongs to the sidelink resource pool.

Alternatively, for example, an available slot 128 corresponds to a bit 0 in the bitmap, and if the bit is 1, the slot 128 belongs to the sidelink resource pool.

Example 12

Assuming that time domain resources located in a resource pool are represented as $(t_0^{SL}, t_1^{SL}, \ldots, t_{T_{max}}^{SL})$, where $0 \leq t_i^{SL} < 1024 \cdot N_{slot}^{frame,\mu}$;

optionally, a slot index (slot index) of the resource is numbered relative to a slot #0 of a system frame number SFN #0 or a direct frame number DFN (Direct Frame Number) #0.

Unavailable resources are excluded from the above time domain resources, assuming that $N_{total}$ are excluded in total, which may include at least one of the following:

resources for SLSS, assuming that there are $N_{SLSS}$;
downlink slots, assuming that there are $N_{dl}$;
flexible slots, assuming that there are $N_{flexible}$; and
resources not meeting the preset requirement, assuming that there are $N_{not}$.

The above time domain resources are sorted in ascending order of index after the unavailable resources are excluded, and the user further determines resources that actually belong to the sidelink resource pool according to the following steps:

obtaining a bitmap $(b_0, b_1, \ldots, b_{L_{bitmap}-1})$ with a length of $L_{bitmap}$;

if a slot $t_k^{SL}$, $(0 \leq k < (1,024 \cdot N_{slot}^{frame,\mu} - N_{total}))$ corresponds to $b_{k'}=1$, where k'=k mod $L_{bitmap}$, the slot belongs to the sidelink resource pool.

For $N_{total}$, in an implementation, $N_{total}$ includes:
resources for SLSS, assuming that there are $N_{SLSS}$;
downlink slots, assuming that there are $N_{dl}$;
flexible slots, assuming that there are $N_{flexible}$; and
in this case, $N_{total}=N_{SLSS}+N_{dl}+N_{flexible}$, where $0 \leq k < (1,024 \cdot N_{slot}^{frame,\mu} - N_{SLSS} - N_{dl} - N_{flexible})$.

In another implementation, $N_{total}$ includes:
resources for SLSS, assuming that there are $N_{SLSS}$;
downlink slots, assuming that there are $N_{dl}$;
flexible slots, assuming that there are $N_{flexible}$;
resources not meeting the preset requirement, assuming that there are $N_{not}$;
in this case, $N_{total}=N_{not}+N_{SLSS}+N_{dl}+N_{flexible}$, where $0 \leq k < (1,024 \cdot N_{slot}^{frame,\mu} - N_{not} - N_{SLSS} - N_{dl} - N_{flexible})$.

Optionally, in this case, it may be considered that the resources not meeting the preset requirement do not include the downlink resources and the flexible resources, and only include resources that include uplink but the uplink part does not meet the preset requirement.

In another implementation, $N_{total}$ includes:
resources for SLSS, assuming that there are $N_{SLSS}$;
resources not meeting the preset requirement, assuming that there are $N_{not}$; and
in this case, $N_{total}=N_{not}+N_{SLSS}$; where $0 \leq k < (1,024 \cdot N_{slot}^{frame,\mu} - N_{not} - N_{SLSS})$.

Optionally, in this case, it may be considered that the resources not meeting the preset requirement include the downlink resources, the flexible resources, and the resources that include uplink but the uplink part does not meet the preset requirement.

For example, a control node provides information on the LTE target sidelink synchronization resource, for example, a quantity of sidelink synchronization resources used for LTE SLSS transmission, and in this case, the resources used for SLSS in the above step at least include the LTE target sidelink synchronization resource. That is, the LTE target sidelink synchronization resource does not belong to the resource pool. Alternatively, for example, the quantity of sidelink synchronization resources used for LTE SLSS transmission is Q, then the resources used for SLSS in the above embodiment are Q subframes or $Q*2^\mu$ slots, where $\mu$ is $\log_2(SCS/15$ kHz), and SCS is the SCS of the SL.

Further, an NR control node, such as a gNB, provides information on the LTE target sidelink synchronization resource, and when determining resources of an NRSL resource pool, the terminal determines that the target sidelink synchronization resources include the LTE target sidelink synchronization resource. Optionally, the terminal determines that: the LTE target sidelink synchronization resource does not belong to the NRSL resource pool, and/or the LTE target sidelink synchronization resource does not correspond to the bit in the resource bitmap.

For example, a control node provides information on the NR target sidelink synchronization resource (for example, a quantity of sidelink synchronization resources used for NR SLSS transmission, and/or a quantity of resources used for NR SLSS transmission within the sidelink synchronization resources), and in this case, the resources used for SLSS in the above step at least include the NR target sidelink synchronization resource. That is, the NR target sidelink synchronization resource does not belong to the resource pool. Alternatively, for example, the quantity of sidelink synchronization resources used for NR SLSS transmission is Q, and the quantity of resources used for NR SLSS transmission within each sidelink synchronization resource is $L_{SLSS}$, then the resources used for SLSS in the above embodiment are $Q*L_{SLSS}$ slots corresponding to the NR target sidelink synchronization resource.

Further, an NR control node, such as a gNB, provides information on the NR target sidelink synchronization resource, and when determining resources of an NRSL resource pool, the terminal determines that the target sidelink synchronization resources include the NR target sidelink synchronization resource. Optionally, the terminal determines that: the NR target sidelink synchronization resource does not belong to the NRSL resource pool, and/or the NR target sidelink synchronization resource does not correspond to the bit in the resource bitmap.

For example, a control node provides information on the NR target sidelink synchronization resource (for example, a quantity of sidelink synchronization resources used for NR SLSS transmission, and/or a quantity of resources used for NR SLSS transmission within the sidelink synchronization resources) and information on the LTE target sidelink synchronization resource (for example, a quantity of sidelink synchronization resources used for LTE SLSS transmission), and in this case, the resources used for SLSS in the above step include the NR target sidelink synchronization resource and the LTE target sidelink synchronization resource. That is, the NR target sidelink synchronization resource and the LTE target sidelink synchronization resource do not belong to the resource pool. Alternatively, for example, the quantity of sidelink synchronization resources used for LTE SLSS transmission is Q1, the quantity of sidelink synchronization resources used for NR SLSS transmission is Q2, and the resources used for NR SLSS transmission and the synchronization resources used for LTE SLSS transmission do not overlap. Assuming that a total quantity of resources used for NR SLSS transmission in the Q2 sidelink synchronization resources used for NR is $Q2_{SLSS}$, then the resources used for SLSS in the above embodiment are Q1 subframes and $Q2_{SLSS}$ slots respectively corresponding to the LTE target sidelink synchronization resource and the NR target sidelink synchronization resource, or $Q1*2\mu+Q2_{SLSS}$ slots, where $\mu$ is $\log_2(SCS/15$ kHz), and SCS is the SCS of the NR SL.

Further, an NR control node, such as a gNB, provides information on the NR target sidelink synchronization resource and the LTE target sidelink synchronization resource, and when determining resources of an NR SL resource pool, the terminal determines that the target sidelink synchronization resources include the NR target sidelink synchronization resource and the LTE target sidelink synchronization resource. Optionally, the terminal determines that: the NR target sidelink synchronization resource and the LTE target sidelink synchronization resource do not belong to the NRSL resource pool, and/or the NR target sidelink synchronization resource and the LTE target sidelink synchronization resource do not correspond to the bit in the resource bitmap.

Figure 2:
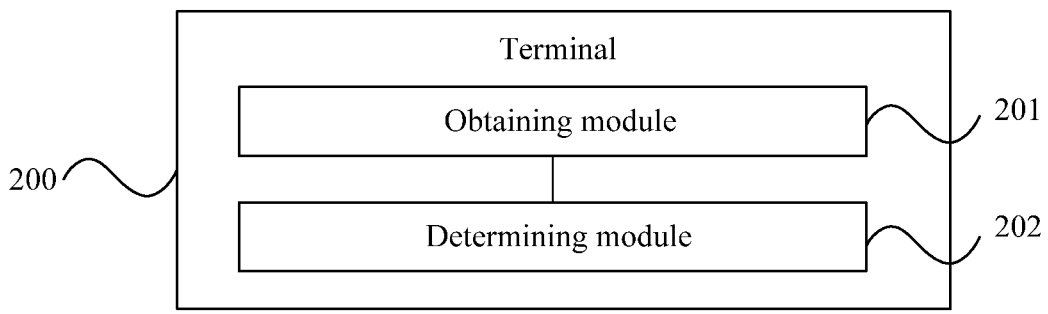
FIG. 2 is a first schematic diagram of a structure of a terminal according to an embodiment of the present disclosure.

As shown in FIG. 2, an embodiment of the present disclosure further provides a terminal 200, including:

an obtaining module 201, configured to obtain resource indication information, where the resource indication information includes at least one of the following: at least one target time period, at least one resource bitmap, and a period of the at least one resource bitmap; and a determining module 202, configured to determine, according to the resource indication information, a resource used for sidelink transmission or a resource used for sidelink transmission within the target time period.

Optionally, in the above embodiment of the present disclosure, a length of the resource bitmap includes at least one of the following:

1; 2; 4; 8; 16; 24; 32; or 64*Z, where Z is an integer greater than or equal to 1.

Optionally, in the foregoing embodiment of the present disclosure, the terminal further includes:

a configuration obtaining module, configured to obtain resource configuration information, where the resource configuration information is used to indicate a first resource; and an available determining module, configured to determine an available resource in the first resource according to the resource configuration information;

where a bit in the resource bitmap corresponds to the available resource.

Optionally, in the foregoing embodiment of the present disclosure, there is a correspondence between the resource indication information and at least one of the following information:

a synchronization reference;

a sidelink synchronization signal identifier;

a coverage status;

a subcarrier spacing;

a time division duplexing TDD period;

an available resource period;

an unavailable resource period;

a quantity of available resources;

a quantity of unavailable resources;

a quantity of synchronization resources; and a quantity of resources contained in synchronization resources and used for transmitting a sidelink synchronization signal.

Optionally, in the foregoing embodiment of the present disclosure, the terminal further includes:

a quantity determining module, configured to determine, according to a first formula, a quantity V of available resources, where the first formula is:

$$V=(D*2^{\mu}-L_{SLSS}-(D*M)/T)*(P_{SL}/D);$$

μ is equal to $\log_2$ (SCS/A); $L_{SLSS}$ represents a quantity of resources contained in one or more target sidelink synchronization resources and used for transmitting a sidelink synchronization signal; T represents a time division duplexing period or an available resource period or an unavailable resource period or a preset period; M represents a quantity of unavailable resources in a period T; $P_{SL}$ represents a time length of the target time period; SCS represents a sidelink subcarrier spacing; A represents a reference subcarrier spacing; and D represents a time length of a reference time period.

Optionally, in the foregoing embodiment of the present disclosure, a quantity of available resources is an integer multiple of the length of the resource bitmap.

Optionally, in the foregoing embodiment of the present disclosure, the available determining module includes:

an available determining sub-module, configured to determine, according to the resource configuration information, a resource other than at least one of an unavailable resource and a target sidelink synchronization resource in the first resource as the available resource.

Optionally, in the foregoing embodiment of the present disclosure, the target sidelink synchronization resource includes at least one of the following:

a sidelink synchronization resource of a bandwidth part BWP to which the determined resource used for sidelink transmission belongs;

a sidelink synchronization resource of all activated BWPs in a carrier to which the determined resource used for sidelink transmission belongs;

a sidelink synchronization resource of all BWPs in a carrier to which the determined resource used for sidelink transmission belongs; a sidelink synchronization resource in a carrier to which the determined resource used for sidelink transmission belongs; and a sidelink synchronization resource in a first carrier.

Optionally, in the foregoing embodiment of the present disclosure, that a bit in the resource bitmap corresponds to the available resource includes:

each bit in the resource bitmap corresponds to available resources of U time unit; and U is greater than or equal to 1.

Optionally, in the foregoing embodiment of the present disclosure, the resource configuration information includes at least one of the following:

uplink and downlink resource configuration information; and sidelink resource configuration information.

Optionally, in the foregoing embodiment of the present disclosure, the obtaining module is configured to perform at least of the following functions:

determining its own resource configuration information;

receiving a broadcast message, where the broadcast message carries the resource configuration information;

receiving a sidelink system information block, where the sidelink system information block carries the resource configuration information;

receiving sidelink radio resource control RRC signaling, where the sidelink RRC signaling carries the resource configuration information;

obtaining pre-configured resource configuration information; and obtaining predefined resource configuration information.

Optionally, in the foregoing embodiment of the present disclosure, the determining module includes:

a determining sub-module, configured to determine, if a bit value of the resource bitmap corresponding to the available resource is a first value, that the available resource is a resource used for sidelink transmission.

Optionally, in the foregoing embodiment of the present disclosure, the correspondence between the bit in the resource bitmap and the available resource includes:

a bit i in the resource bitmap corresponds to an available resource i', where i=i' mod L, and L represents the length of the resource bitmap.

Optionally, in the foregoing embodiment of the present disclosure, the resource used for sidelink transmission includes at least one of the following:

a second resource used for sidelink transmit; and a third resource used for sidelink receive.

Optionally, in the foregoing embodiment of the present disclosure, if there is a correspondence between the second resource and the third resource, contents contained in the resource indication information are completely the same.

Optionally, in the foregoing embodiment of the present disclosure, the correspondence includes at least one of the following:

a correspondence between the second resource and the third resource with a same target identifier;

a correspondence between the second resource and the third resource with a same subcarrier spacing;

a correspondence between the second resource and the third resource with a same cyclic prefix;

a correspondence between the second resource and the third resource with a same priority;

a correspondence between the second resource and the third resource with a same quality of service QoS requirement;

a correspondence between the second resource and the third resource that can be used for unicast transmission;

a correspondence between the second resource and the third resource that can establish a PC5 radio resource control RRC connection; and a correspondence between the second resource and the third resource that contain a same feedback resource.

The terminal provided in this embodiment of the present disclosure can implement the processes implemented by the terminal in the method embodiment in FIG. 1. To avoid repetition, details are not described herein again.

The embodiments of the present disclosure carry at least one of the at least one target time period, the at least one resource bitmap the period of the at least one resource bitmap through the resource indication information; and the terminal can determine, according to the resource indication information, a resource used for sidelink transmission or a resource used for sidelink transmission within the target time period, thereby implementing sidelink transmission.

Figure 3:
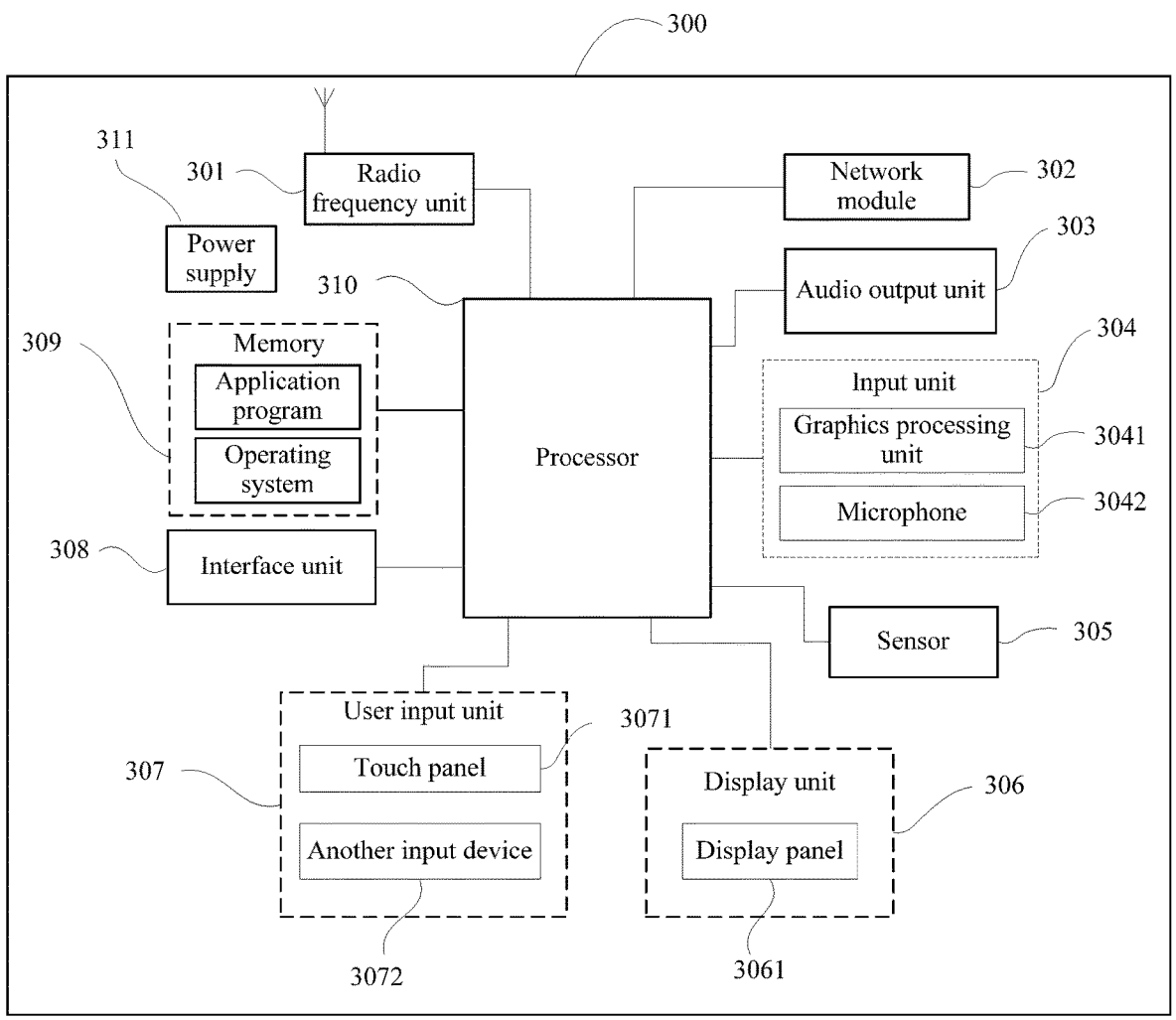
FIG. 3 is a second schematic diagram of a structure of a terminal according to an embodiment of the present disclosure.

FIG. 3 is a schematic diagram of a hardware structure of a terminal for implementing the embodiments of the present disclosure. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. It can be understood by a person skilled in the art that, the terminal structure shown in FIG. 3 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The frequency unit 301 is configured to obtain resource indication information, where the resource indication information includes at least one of the following: at least one target time period, at least one resource bitmap, and a period of the at least one resource bitmap; and the processor 310 is configured to determine, according to the resource indication information, a resource used for sidelink transmission or a resource used for sidelink transmission within the target time period.

The terminal provided in this embodiment of the present disclosure can implement the processes implemented by the terminal in the method embodiment in FIG. 1. To avoid repetition, details are not described herein again.

The embodiments of the present disclosure carry at least one of the at least one target time period, the at least one resource bitmap the period of the at least one resource bitmap through the resource indication information; and the terminal can determine, according to the resource indication information, a resource used for sidelink transmission or a resource used for sidelink transmission within the target time period, thereby implementing sidelink transmission.

It should be understood that, in this embodiment of the present disclosure, the radio frequency unit 301 may be configured to receive and send information or a signal in a call process. Alternatively, after receiving downlink data from a base station, the radio frequency unit sends the downlink data to the processor 310 for processing. In addition, the radio frequency unit sends uplink data to the base station. Usually, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices through a wireless communication system.

The terminal provides wireless broadband Internet access for the user by using the network module 302, for example, helping the user to send and receive an e-mail, brows a web page, and access streaming media.

The audio output unit 303 may convert audio data received by the radio frequency unit 301 or the network module 302 or stored in the memory 309 into an audio signal and output the audio signal as a sound. In addition, the audio output unit 303 may further provide an audio output (for example, a call signal received voice, or a message received voice) related to a specific function implemented by the terminal 300. The audio output unit 303 includes a speaker, a buzzer, a telephone receiver, and the like.

The input unit 304 is configured to receive audio or radio frequency signals. The input unit 304 may include a graphics processing unit (Graphics Processing Unit, GPU) 3041 and a microphone 3042. The graphics processing unit 3041 processes image data of a static picture or a video obtained by an image capture apparatus (such as a camera) in a video capture mode or an image capture mode. A processed image frame may be displayed on the display unit 306. The image frame processed by the graphics processing unit 3041 may be stored in the memory 309 (or another storage medium) or sent by using the radio frequency unit 301 or the network module 302. The microphone 3042 may receive sound and can process such sound into audio data. The processed audio data may be converted in a call mode into a format that can be sent by the radio frequency unit 301 to a mobile communication base station for outputting.

The terminal 300 further includes at least one sensor 305, such as an optical sensor, a motion sensor, and another sensor. Alternatively, the light sensor includes an ambient light sensor and a proximity sensor. The ambient light sensor may adjust luminance of the display panel 3061 based on brightness of ambient light. The proximity sensor may turn off the display panel 3061 and/or backlight when the terminal 300 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by the user or information provided for the user. The display unit 306 may include a display panel 3061, and the display panel 3061 may be configured in a form of a liquid crystal display (LCD), an organic light-emitting diode (OLED), or the like.

The user input unit 307 may be configured to receive input numeral or character information, and generate key signal input related to user setting and functional control of the terminal. Alternatively, the user input unit 307 includes a touch panel 3071 and another input device 3072. The touch panel 3071 is also referred to as a touchscreen, and may collect a touch operation performed by a user on or near the touch panel (for example, an operation performed by a user on the touch panel 3071 or near the touch panel 3071 by using any proper object or accessory, for example, a finger or a stylus). The touch panel 3071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor 310, and receives and executes a command sent by the processor 310. In addition, the touch panel 3071 may be implemented in various types such as a resistor, a capacitor, an infrared ray, or a surface acoustic wave. The user input unit 307 may include another input device 3072 in addition to the touch panel 3071. Alternatively, the other input devices 3072 may include but are not limited to: a physical keyboard, a function key (such as a volume control key, a switch key), a trackball, a mouse, and a joystick. Details are not described herein.

Further, the touch panel 3071 may cover the display panel 3061. When detecting the touch operation on or near the touch panel 3071, the touch panel 3071 transmits the touch operation to the processor 310 to determine a type of a touch event, and then the processor 310 provides corresponding visual output on the display panel 3061 based on the type of the touch event. In FIG. 3, although the touch panel 3071 and the display panel 3061 are used as two independent parts to implement input and output functions of the terminal, in some embodiments, the touch panel 3071 and the display panel 3061 may be integrated to implement the input and output functions of the terminal. This is not specifically limited herein.

The interface unit 308 is an interface for connecting an external apparatus with the terminal 300. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 308 may be configured to receive input (for example, data information and power) from an external apparatus and transmit the received input to one or more elements in the terminal 300 or may be configured to transmit data between the terminal 300 and an external apparatus.

The memory 309 may be configured to store a software program and various data. The memory 309 may mainly include a program storage area and a data storage area. The program storage area may store an operating system, an application program required by at least one function (for example, a sound play function or an image display function), and the like. The data storage area may store data (for example, audio data or an address book) or the like created based on use of a mobile phone. In addition, the memory 309 may include a high-speed random access memory or a nonvolatile memory, for example, at least one disk storage device, a flash memory, or other volatile solid-state storage devices.

The processor 310 is a control center of the terminal, and connects all parts of the entire terminal by using various interfaces and lines. By running or executing a software program and/or a module stored in the memory 309 and invoking data stored in the memory 309, the processor 310 performs various functions of the terminal and data processing, to perform overall monitoring on the terminal. The processor 310 may include one or more processing units. Preferably, an application processor and a modem processor may be integrated into the processor 310. The application processor mainly processes an operating system, a user interface, an application, and the like. The modem processor mainly processes wireless communications. It can be understood that, alternatively, the modem processor may not be integrated into the processor 310.

The terminal 300 may further include the power supply 311 (such as a battery) that supplies power to each component. Preferably, the power supply 311 may be logically connected to the processor 310 by using a power management system, so as to implement functions such as charging, discharging, and power consumption management by using the power management system.

In addition, the terminal 300 includes some function modules not shown, and details are not described herein.

Preferably, an embodiment of the present disclosure further provides a terminal, including a processor, a memory, a computer program stored in the memory and executable on the processor. When the computer program is executed by the processor, processes of the embodiment of the foregoing resource determining method are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing resource determining method embodiment are implemented and a same technical effect can be achieved. To avoid repetition, details are not described herein again. The computer-readable storage medium includes a read-only memory (Read-Only Memory, ROM for short), a random access memory (Random Access Memory, RAM for short), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

"And/or" used in this specification and claims of this application means at least one of the associated objects. For example, "A and/or B" represents the following three cases: Only A exists, only B exists, or both A and B exist; and "at least one of A and B" also represents the following three cases: only A exists, only B exists, or both A and B exist.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

The embodiments of the present disclosure are described above with reference to the accompanying drawings, but the present disclosure is not limited to the above specific implementations. The above specific implementations are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A resource determining method performed by a terminal, comprising:
obtaining resource indication information, wherein the resource indication information comprises at least one of the following: at least one target time period, at least one resource bitmap, or a period of the at least one resource bitmap; and determining, according to the resource indication information, a resource used for sidelink transmission or a resource used for sidelink transmission within the target time period;

wherein the method further comprises:

obtaining resource configuration information, wherein the resource configuration information is used to indicate a first resource; and determining an available resource in the first resource according to the resource configuration information;

wherein a bit in the resource bitmap corresponds to the available resource;

wherein the obtaining resource configuration information comprises any one of the following:

receiving a main information block (MIB) carried by a sidelink broadcast channel, wherein the MIB carries the resource configuration information;

receiving a sidelink system information block (SIB), wherein the SIB carries the resource configuration information; and receiving sidelink radio resource control (RRC) signaling, wherein the sidelink RRC signaling carries the resource configuration information.

2. The method according to claim 1, wherein a length of the resource bitmap comprises at least one of the following: 1; 2; 4; 8; 16; 24; 32; or 64*Z, wherein Z is an integer greater than or equal to 1.

3. The method according to claim 1, wherein there is a correspondence between the resource indication information and at least one of the following information:

a synchronization reference;
a sidelink synchronization signal identifier;
a coverage status;
a subcarrier spacing;
a time division duplexing (TDD) period;
an available resource period;
an unavailable resource period;
a quantity of available resources;
a quantity of unavailable resources;
a quantity of synchronization resources; or
a quantity of resources contained in synchronization resources and used for transmitting a sidelink synchronization signal.

4. The method according to claim 1, further comprising: determining, according to a first formula, a quantity V of available resources, wherein the first formula is:

$$V=(D*2\mu\text{-}LSLSS\text{-}(D*M)/T)*(PSL/D);$$

wherein $\mu$ is equal to log2 (SCS/A); LSLSS represents a quantity of resources contained in one or more target sidelink synchronization resources and used for transmitting a sidelink synchronization signal; T represents a time division duplexing period or an available resource period or an unavailable resource period or a preset period; M represents a quantity of unavailable resources in a period T; PSL represents a time length of the target time period; SCS represents a sidelink subcarrier spacing; A represents a reference subcarrier spacing; and D represents a time length of a reference time period.

5. The method according to claim 1, wherein a quantity of available resources is an integer multiple of the length of the resource bitmap.

6. The method according to claim 1, wherein the determining an available resource in the first resource according to the resource configuration information comprises:

determining, according to the resource configuration information, a resource other than at least one of an unavailable resource or a target sidelink synchronization resource in the first resource as the available resource.

7. The method according to claim 6, wherein the target sidelink synchronization resource comprises one of the following:

a sidelink synchronization resource of a bandwidth part (BWP) to which the determined resource used for sidelink transmission belongs;

a sidelink synchronization resource of all activated BWPs in a carrier to which the determined resource used for sidelink transmission belongs;

a sidelink synchronization resource of all BWPs in a carrier to which the determined resource used for sidelink transmission belongs;

a sidelink synchronization resource in a carrier to which the determined resource used for sidelink transmission belongs; and a sidelink synchronization resource in a first carrier.

8. The method according to claim 1, wherein the bit in the resource bitmap corresponds to the available resource, comprising:

each bit in the resource bitmap corresponds to available resources of U time unit; and U is greater than or equal to 1.

9. The method according to claim 1, wherein the resource configuration information comprises at least one of the following:

uplink and downlink resource configuration information; or sidelink resource configuration information.

10. The method according to claim 1, wherein the determining, according to the resource indication information, a resource used for sidelink transmission comprises:

in a case that a bit value of the resource bitmap corresponding to the available resource is a first value, determining that the available resource is a resource used for sidelink transmission.

11. The method according to claim 1, wherein a correspondence between the bit in the resource bitmap and the available resource comprises:

a bit i in the resource bitmap corresponds to an available resource i', wherein i=i' mod L, and L represents the length of the resource bitmap.

12. The method according to claim 1, wherein the resource used for sidelink transmission comprises at least one of the following:

a second resource used for sidelink transmit; or
a third resource used for sidelink receive.

13. The method according to claim 12, wherein in a case that there is a correspondence between the second resource and the third resource, contents contained in the resource indication information are at least partially the same.

14. The method according to claim 13, wherein the correspondence comprises at least one of the following:

a correspondence between the second resource and the third resource with a same target identifier;

a correspondence between the second resource and the third resource with a same subcarrier spacing;

a correspondence between the second resource and the third resource with a same cyclic prefix;

a correspondence between the second resource and the third resource with a same priority;

a correspondence between the second resource and the third resource with a same quality of service (QoS) requirement;

a correspondence between the second resource and the third resource that can be used for unicast transmission;

a correspondence between the second resource and the third resource that can establish a PC5 RRC connection; or a correspondence between the second resource and the third resource that contain a same feedback resource.

15. A terminal, comprising:

a processor; and a memory storing a program that is capable of running on the processor;

wherein the program, when executed by the processor, causes the terminal to:

obtain resource indication information, wherein the resource indication information comprises at least one of the following: at least one target time period, at least one resource bitmap, or a period of the at least one resource bitmap; and determine, according to the resource indication information, a resource used for sidelink transmission or a resource used for sidelink transmission within the target time period;

wherein the program, when executed by the processor, further causes the terminal to:

obtain resource configuration information, wherein the resource configuration information is used to indicate a first resource; and determine an available resource in the first resource according to the resource configuration information;

wherein a bit in the resource bitmap corresponds to the available resource;

wherein obtaining the resource configuration information comprises any one of the following:

receiving a main information block (MIB) carried by a sidelink broadcast channel, wherein the MIB carries the resource configuration information;

receiving a sidelink system information block (SIB), wherein the SIB carries the resource configuration information; and receiving sidelink radio resource control (RRC) signaling, wherein the sidelink RRC signaling carries the resource configuration information.

16. The terminal according to claim 15, wherein the program, when executed by the processor, further causes the terminal to:

determine, according to a first formula, a quantity V of available resources, wherein the first formula is:

$$V=(D*2\mu\text{-}LSLSS\text{-}(D*M)/T)*(PSL/D);$$

wherein $\mu$ is equal to log2 (SCS/A); LSLSS represents a quantity of resources contained in one or more target sidelink synchronization resources and used for transmitting a sidelink synchronization signal; T represents a time division duplexing period or an available resource period or an unavailable resource period or a preset period; M represents a quantity of unavailable resources in a period T; PSL represents a time length of the target time period; SCS represents a sidelink subcarrier spacing; A represents a reference subcarrier spacing; and D represents a time length of a reference time period.

17. The terminal according to claim 15, wherein a length of the resource bitmap comprises at least one of the following:

1; 2; 4; 8; 16; 24; 32; or 64*Z, wherein Z is an integer greater than or equal to 1.

18. The terminal according to claim 15, wherein there is a correspondence between the resource indication information and at least one of the following information:

a synchronization reference;

a sidelink synchronization signal identifier;

a coverage status;

a subcarrier spacing;

a time division duplexing (TDD) period;

an available resource period;

an unavailable resource period;

a quantity of available resources;

a quantity of unavailable resources;

a quantity of synchronization resources; or a quantity of resources contained in synchronization resources and used for transmitting a sidelink synchronization signal.

19. The terminal according to claim 15, wherein a quantity of available resources is an integer multiple of the length of the resource bitmap.

20. A non-transitory computer readable storage medium, wherein the non-transitory computer readable storage medium stores a computer program, and the computer program, when executed by a processor, causes the processor to:

obtain resource indication information, wherein the resource indication information comprises at least one of the following: at least one target time period, at least one resource bitmap, or a period of the at least one resource bitmap; and determine, according to the resource indication information, a resource used for sidelink transmission or a resource used for sidelink transmission within the target time period;

wherein the program, when executed by the processor, further causes the processor to:

obtain resource configuration information, wherein the resource configuration information is used to indicate a first resource; and determine an available resource in the first resource according to the resource configuration information;

wherein a bit in the resource bitmap corresponds to the available resource;

wherein obtaining the resource configuration information comprises any one of the following:

receiving a main information block (MIB) carried by a sidelink broadcast channel, wherein the MIB carries the resource configuration information;

receiving a sidelink system information block (SIB), wherein the SIB carries the resource configuration information; and receiving sidelink radio resource control (RRC) signaling, wherein the sidelink RRC signaling carries the resource configuration information.

* * * * *